Oct. 21, 1930.  R. TARSHIS  1,779,054
HELICOPTER
Filed Jan. 25, 1930
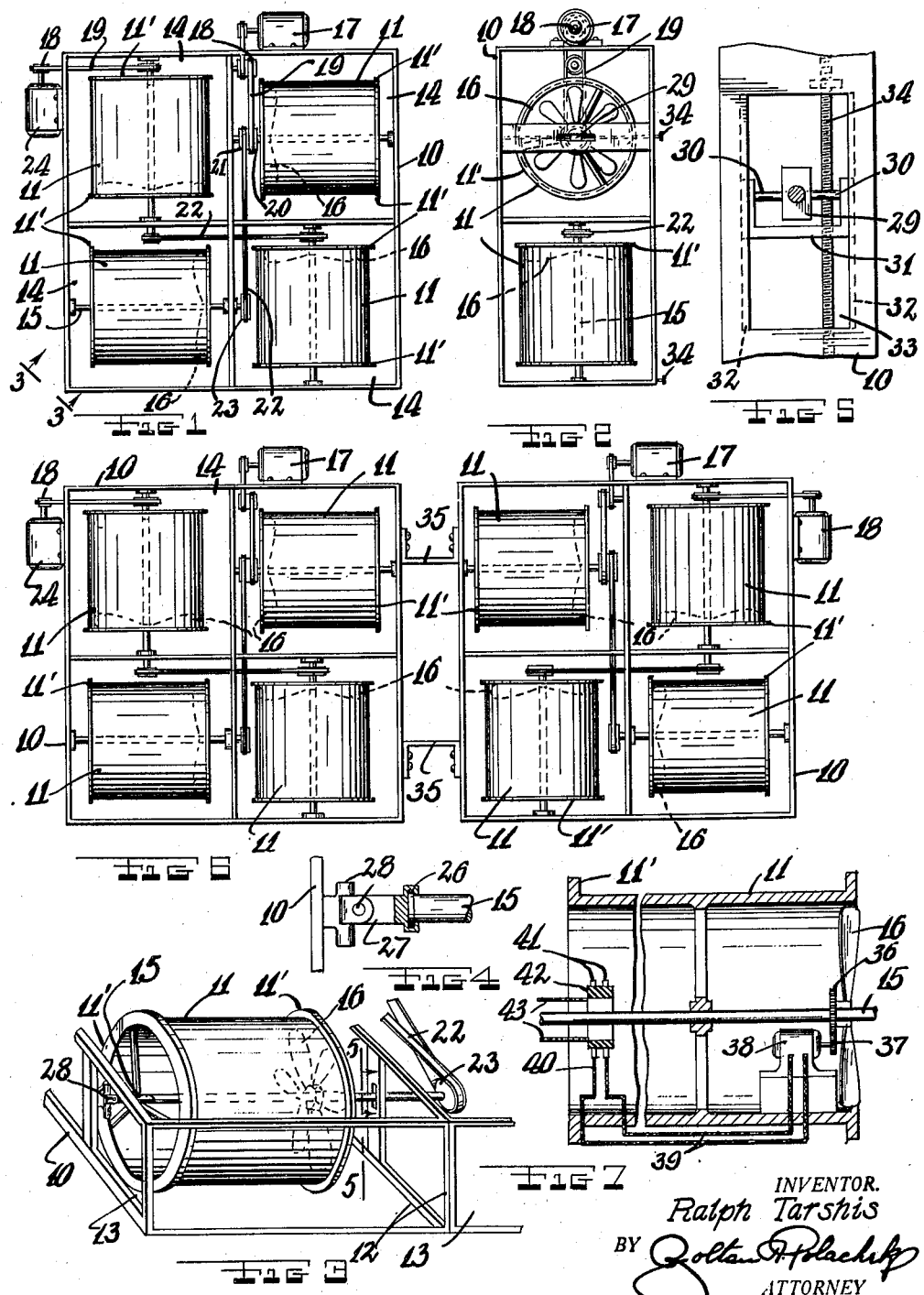
INVENTOR.
Ralph Tarshis
BY
ATTORNEY Patented Oct. 21, 1930

1,779,054

UNITED STATES PATENT OFFICE

RALPH TARSHIS, OF BROOKLYN, NEW YORK

HELICOPTER

Application filed January 25, 1930. Serial No. 423,389.

This invention relates to new and useful improvements in a helicopter.

The invention has for an object the provision of a device of the class mentioned which is of simple durable construction, dependable in use and efficient in action, and which can be manufactured and sold at a reasonable cost.

The invention proposes a frame of longitudinal members arranged so as to be open to permit complete circulation of air, a plurality of hollow cylinders constituting helicopters rotatively mounted in said frame in substantially a single plane and having their axes at substantially right angles to each other in an endless fashion, means for rotating said cylinders, a fan for each of the cylinders capable of drawing the air thru the cylinder and forcing it against the outer side of one of the adjacent cylinders, and means for adjusting the fans to direct the drafts slightly upwards or downwards.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:—

Fig. 1 is a plan view of a device constructed according to this invention.

Fig. 2 is an end elevational view of Fig. 1.

Fig. 3 is an enlarged fragmentary perspective view looking in the direction of the line 3—3 of Fig. 1.

Fig. 4 is a fragmentary detailed view of one of the ends of a shaft used to support the cylindrical member.

Fig. 5 is a fragmentary enlarged elevational view looking in the direction of the line 5—5 of Fig. 3.

Fig. 6 is a plan view similar to Fig. 1 but showing two of the devices attached to each other for counterbalancing twisting.

Fig. 7 is a fragmentary sectional view of one of the hollow cylinders shown constructed according to modified form.

The helicopter consists of a frame 10 of longitudinal members arranged so as to be open to permit complete circulation of air, a plurality of hollow cylinders 11 having flanged extremities 11' constituting helicopters rotatively mounted in said frame in substantially right angles to each other in an endless fashion, means for rotating said cylinders, a fan for each of the cylinders capable of drawing the air thru the cylinder and forcing it against the outer side of one adjacent cylinder. and means for adjusting the fans to direct the drafts slightly upwards or downwards.

The frame 10 is shown formed from longitudinal members 12 bolted or welded together and arranged so that openings 13 exist in all sides. These openings allow the passage of air as forced by the hollow cylinders during their rotations. As shown in Fig. 1 the frame is divided into four areas indicated by reference numerals 14. Each of the areas 14 is provided with one of the said cylinders 11 and these cylinders are so arranged that their axes are at right angles to each other. As seen in Fig. 2 all of the cylinders are substantially in a single plane.

A shaft 15 coincides with each of the axes of the cylinders and supports a fan 16 at one of the ends of the cylinder. This fan in turn is attached to the interior of the cylinder for supporting it. The shaft 15 is rotatively supported and constitutes the rotative mounting of the cylinder. The means for rotating said cylinders consist of a motor 17 attached upon the frame 10 and provided with a pulley 18 receiving a belt 19 extended over a pulley 20 upon one of the shafts 15. This shaft is provided with another pulley 21 engaged by a strap 22 directed over a pulley 23 upon a different one of shafts 15, and particularly one of the shafts parallel with the said shaft. A second motor 24 is mounted upon the frame 10 and is similarly connected to drive the other two of the cylinders. Like numerals are used to represent the corresponding drives of both systems.

The fans 16 are arranged at the ends of the cylinders adjacent the other cylinders so that upon rotation they draw a draft of air thru the cylinders and discharge this current upon the adjacent cylinder. The means for adjusting the fans to direct the drafts slightly upwards or downwards consists of one end of each of the shafts being arranged with a thrust bearing 26 connecting it with a stub member 27 in turn connected with a universal joint 28 supported upon the frame 10. The other end of each of the shafts 15 is engaged in a bearing block 29 provided with trunnions 30 engaging a bracket 31 slidably mounted in grooves 32 formed in a cutout 33 in one of the members of the frame 10. A screw 34 is rotatively mounted in the frame 10 and threadedly engages thru the bracket 31 so that upon rotation the bracket moves upwards or downwards.

For adjusting any one of the cylinders 11 it is merely necessary to manually rotate the screw 34 so as to tilt the shaft 15 and thus direct the air from the fan either slightly upwards or slightly downwards. The universal joint at the other end of the shaft permits such tilting. The thrust bearing 26 allows rotations of the shaft at all times. The flexibility of the belts are depended upon to operate the various shafts even though in slightly tilted positions.

In Fig. 6, two of the units shown in Fig. 1 are connected by brackets 35. They are so arranged that during operations, if there happens to be any twisting forces, they counterbalance each other so that any attempts to spin around in a circle is obviated. While two of the units have been shown connected together, any number may be connected for reducing any twisting forces. In Fig. 7 a modified form of the device has been shown in which the fan 16 is capable of running independently of the cylinder 11. Thus the fan may rotate faster or slower than the cylinder to accomplish the blowing, or may rotate in the opposite direction.

The fan 16 shown in Fig. 7 is rotatively mounted upon the shaft 15 and connects with a gear 36 meshing with a pinion 37 upon a motor 38 mounted on the cylinder 11. Leads 39 connect from the terminals of the motor to contacts 40 engaging stationary collector rings 41 supported upon an insulation ring 42 by stationary arms 43. This arrangement allows for the supplying of current to the motor even though the motor moves around along with the cylinder.

In order for the helicopter to rise vertically from the plan view shown in Figures 1 and 6, it is necessary that suction be created at the top and pressure at the bottom. The rotating of the various cylinders tends to disturb the air, and the blowing of the fan against the rotating cylinders causes pressure at one side and suction on the other side accomplishing helicopter movements. The adjustment of the inclination of the cylinders to change the draft of air, obviously produces adjustments for producing different amount of pressures and different agility of the device.

It is to be understood that the adjusting means of the fans shown in Fig. 5 may be at either side of cylinder 11 or it may be at both sides to be able to adjust fans 16 angularly or to be able to raise and lower the said fans as desired.

The fans may also be set in position without applying the adjusting means.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A helicopter, comprising a frame of longitudinal members arranged so as to be open to permit complete circulation of air, a plurality of hollow cylinders constituting helicopters rotatively mounted in said frame in substantially a single plane and having their axes at substantially right angles to each other in an endless fashion, means for rotating said cylinders, a fan for each of the cylinders capable of drawing the air thru the cylinder and forcing it against the outer side of one adjacent cylinder.

2. A helicopter, comprising a frame of longitudinal members arranged so as to be open to permit complete circulation of air, a plurality of hollow cylinders constituting helicopters rotatively mounted in said frame in substantially a single plane and having their axes at substantially right angles to each other in an endless fashion, means for rotating said cylinders, a fan for each of the cylinders capable of drawing the air thru the cylinder and forcing it against the outer side of one adjacent cylinder; said cylinder terminates in annular flanges.

3. A helicopter, comprising a frame of longitudinal members arranged so as to be open to permit complete circulation of air, a plurality of hollow cylinders constituting helicopters rotatively mounted in said frame in substantially a single plane and having their axes at substantially right angles to each other in an endless fashion, means for rotating said cylinders, a fan for each of the cylinders capable of drawing the air thru the cylinder and forcing it against the outer side of one adjacent cylinder, and means for adjusting the fans to direct the drafts slightly upwards or downwards.

4. A helicopter, comprising a frame, a plurality of hollow cylinders having flanged extremities constituting helicopters rotatively mounted in said frame in substantially a single plane and having their axes at substantially right angles to each other in an endless fashion, means for rotating said cylinders, a fan for each of the cylinders capable of drawing the air thru the cylinder and forcing it against the outer side of one adjacent cylinder, and means for adjusting the fans to direct the drafts slightly upwards or downwards.

5. A helicopter, comprising a frame of longitudinal members arranged so as to be open to permit complete circulation of air, a plurality of hollow cylinders having flanged extremities constituting helicopters rotatively mounted in said frame in substantially a single plane and having their axes at substantially right angles to each other in an endless fashion, means for rotating said cylinders, a fan for each of the cylinders capable of drawing the air thru the cylinder and forcing it against the outer side of one adjacent cylinder, and means for adjusting the fans to direct the drafts slightly upwards or downwards, said means for rotating said cylinders comprising a driver element mounted upon the frame and connected with a system of belting to accomplish the rotating.

6. A helicopter, comprising a frame of longitudinal members arranged so as to be open to permit complete circulation of air, a plurality of hollow cylinders having flanged extremities constituting helicopters rotatively mounted in said frame in substantially a single plane and having their axes at substantially right angles to each other in an endless fashion, means for rotating said cylinders, a fan for each of the cylinders capable of drawing the air thru the cylinder and forcing it against the outer side of one adjacent cylinder, and means for adjusting the fans to direct the drafts slightly upwards or downwards, the rotative mounting of each of the cylinders being accomplished by a shaft rotatively supported in the frame.

7. A helicopter, comprising a frame of longitudinal members arranged so as to be open to permit complete circulation of air, a plurality of hollow cylinders having flanged extremities constituting helicopters rotatively mounted in said frame in substantially a single plane and having their axes at substantially right angles to each other in an endless fashion, means for rotating said cylinders, a fan for each of the cylinders capable of drawing the air thru the cylinder and forcing it against the outer side of one adjacent cylinder, and means for adjusting the fans to direct the drafts slightly upwards or downwards, the rotative mounting of each of the cylinders being accomplished by a shaft rotatively supported in the frame, and each of said fans being fixed upon one of said shafts.

8. A helicopter, comprising a frame of longitudinal members arranged so as to be open to permit complete circulation of air, a plurality of hollow cylinders having flanged extremities constituting helicopters rotatively mounted in said frame in substantially a single plane and having their axes at substantially right angles to each other in an endless fashion, means for rotating said cylinders, a fan for each of the cylinders capable of drawing the air thru the cylinder and forcing it against the outer side of one adjacent rotating cylinder, and means for adjusting the fans to direct the drafts slightly upwards or downwards, the rotative mounting of each of the cylinders being accomplished by a shaft rotatively supported in the frame, the means for adjusting the direction of the fans comprising a universal joint at one end of the shaft for permitting various tiltings, and means for holding the other end of the shaft in various tilted positions.

In testimony whereof I have affixed my signature.

RALPH TARSHIS.